(12) United States Patent
Borkowski et al.

(10) Patent No.: US 12,327,325 B2
(45) Date of Patent: Jun. 10, 2025

(54) METHOD AND APPARATUS FOR ANALYZING COMPUTED TOMOGRAPHY DATA

(71) Applicant: RAYTHEON TECHNOLOGIES CORPORATION, Farmington, CT (US)

(72) Inventors: Luke B. Borkowski, West Hartford, CT (US); Kevin L. Rugg, Fairfield, CT (US)

(73) Assignee: RTX CORPORATION, Farmington, CT (US)

( * ) Notice: Subject to any disclaimer, the term of this patent is extended or adjusted under 35 U.S.C. 154(b) by 155 days.

(21) Appl. No.: 18/108,844

(22) Filed: Feb. 13, 2023

(65) Prior Publication Data

US 2024/0273845 A1    Aug. 15, 2024

(51) Int. Cl.
*G06T 19/20*    (2011.01)
*G06T 7/11*    (2017.01)

(52) U.S. Cl.
CPC ............. *G06T 19/20* (2013.01); *G06T 7/11* (2017.01); *G06T 2207/10081* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,041,132 A * | 3/2000 | Isaacs | G06T 11/008 600/407 |
| 8,442,301 B2 * | 5/2013 | Dragovich | G06T 7/001 382/152 |
| 11,480,533 B1 | 10/2022 | Schiefelbein | |
| 2016/0203594 A1 * | 7/2016 | Morard | G06T 7/40 382/152 |

(Continued)

FOREIGN PATENT DOCUMENTS

JP    06653164    2/2020

OTHER PUBLICATIONS

Nikishkov et al.; "Measurement of voids in composites by X-ray Computed Tomography:" Composites Science and Technology 89 (2013) pp. 89-97 (Year: 2013).*

(Continued)

*Primary Examiner* — Edward Martello
(74) *Attorney, Agent, or Firm* — Carlson, Gaskey & Olds, P.C.

(57) ABSTRACT

A method of analyzing computed tomography data includes creating a mesh of a sampling surface that extends through a component to obtain a meshed surface; creating a plurality of additional surfaces that are different from each other and from the meshed surface, and that each correspond to one or more of a translation and a rotation of the meshed surface; querying an interpolant function, which is fitted to CT data of the component, at a plurality of points of the meshed surface to project the CT data onto the meshed surface; querying the interpolant function at a plurality of points of the additional surfaces to project the CT data onto the (Continued)

additional surfaces; and determining, for each of the plurality of points of the meshed surface, whether the point is a void based on the querying for the meshed surface and the querying for the additional surfaces.

16 Claims, 6 Drawing Sheets

(56) References Cited

U.S. PATENT DOCUMENTS

2022/0358709 A1* 11/2022 Stiebeiner ............... G06T 17/20

OTHER PUBLICATIONS

Lua et al.; "Characterization of Fabrication Induced Defects and Assessment of Their Effects on Integrity of Composite Structures;" Presented at the AHS International 74th Annual Forum & Technology Display, Phoenix, Arizona, USA, May 14-17, 2018. (Year: 2018).*

European Search Report for European Patent Application No. 24157352.6 dated Jul. 9, 2024.

Seon et al., "Towards a digital twin for mitigating void formation during debulking of autoclave composite parts", Engineering Fracture Mechanics, vol. 225, Nov. 25, 2019.

Zeng et al., "Damage characterization and numerical simulation of shear experiment of plain woven glass-fiber reinforced composites based on 3D geometric reconstruction", Composite Structures, vol. 233, Nov. 30, 2019.

* cited by examiner

METHOD AND APPARATUS FOR ANALYZING COMPUTED TOMOGRAPHY DATA

BACKGROUND

This application relates to a method and apparatus for analyzing computed tomography data.

It is known to use ceramic matrix composite (CMC) materials for aircraft components, such as turbine blade airfoils. CMC components are typically formed by injecting an infiltrant into layers of fiber material, such as laminate sheets, causing the infiltrant and fiber material to react and form a solid composite component. Complex void structures are often formed in CMC components, and those voids are of interest due to their effect on mechanical and thermal properties of the component.

Computed tomography ("CT") refers to a computerized x-ray imaging procedure in which a beam of x-rays is aimed at an object and quickly rotated around the object, producing signals that are processed by a computing device to generate cross-sectional images, or "slices," of the object. Complex void structures of components (e.g., non-uniform interfacial surfaces of CMC components) present challenges for CT data analysis.

SUMMARY

A method of analyzing computed tomography data according to an example embodiment of the present disclosure includes creating a mesh of a sampling surface that extends through a component to obtain a meshed surface; creating a plurality of additional surfaces that are different from each other and from the meshed surface, and that each correspond to one or more of a translation and a rotation of the meshed surface; and querying an interpolant function, which is fitted to computed tomography (CT) data of the component, at a plurality of points of the meshed surface to project the CT data onto the meshed surface. The method also includes querying the interpolant function at a plurality of points of the additional surfaces to project the CT data onto the additional surfaces; determining, for each of the plurality of points of the meshed surface, whether the point is a void based on the querying for the meshed surface and the querying for the additional surfaces; and calculating a metric of the component based on the determining, and providing a notification of the metric.

In a further embodiment of the foregoing embodiment, for each of the additional surfaces, each of the plurality of points of the additional surface corresponds to a respective one of the points of the meshed surface, and the determining includes determining that a particular point of the meshed surface is a void based on a predefined quantity of its corresponding points in the additional surfaces being a void.

In a further embodiment of any of the foregoing embodiments, the predefined quantity is one.

In a further embodiment of any of the foregoing embodiments, each of the additional surfaces are parallel to the meshed surface and are translations of the meshed surface along vectors that are normal to the meshed surface, and for each of the points of the meshed surface, the point and the corresponding points in the additional surfaces are provided on one of the vectors.

In a further embodiment of any of the foregoing embodiments, for each of the points of the meshed surface, the corresponding points are provided on opposing sides of the meshed surface.

In a further embodiment of any of the foregoing embodiments, the method includes aligning a computer model of the sampling surface with the CT data prior to the querying steps, such that the computer model of the surface and the CT data are aligned for the projection of the CT data onto the meshed surface.

In a further embodiment of any of the foregoing embodiments, the aligning the computer model of the sampling surface with the CT data includes performing a translation, a rotation, or both, of one or both of the computer model and the CT data.

In a further embodiment of any of the foregoing embodiments, the CT data of the component is segmented CT data, the component is a ceramic matric composite (CMC) component, and the method includes obtaining initial CT data for the CMC component, and segmenting the initial CT data between CMC and voids to obtain the segmented CT data.

In a further embodiment of any of the foregoing embodiments, the metric is a void area fraction of the sampling surface that extends through the CMC component.

In a further embodiment of any of the foregoing embodiments, at least a portion of the sampling surface includes an interfacial area where layers of the CMC component abut each other.

A system for analysis of computed tomography data according to an example embodiment of the present disclosure includes processing circuitry operatively connected to memory. The processing circuitry is configured to create a mesh of a sampling surface that extends through a component to obtain a meshed surface; create a plurality of additional surfaces that are different from each other and from the meshed surface, and that each correspond to one or more of a translation and a rotation of the meshed surface; and query an interpolant function, which is fitted to computed tomography (CT) data of the component, at a plurality of points of the meshed surface to project the CT data onto the meshed surface. The processing circuitry is configured to query the interpolant function at a plurality of points of the additional surfaces to project the CT data onto the additional surfaces; determine, for each of the plurality of points of the meshed surface, whether the point is a void based on the querying for the meshed surface and the querying for the additional surfaces; and calculate a metric of the component based on the determining, and provide a notification of the metric.

In a further embodiment of the foregoing embodiment, for each of the additional surfaces, each of the plurality of points of the additional surface corresponds to a respective one of the points of the meshed surface. To determine, for each of the plurality of points of the meshed surface, whether the point is a void, the processing circuitry is configured to determine that a particular point of the meshed surface is a void based on a predefined quantity of its corresponding points in the additional surfaces being a void.

In a further embodiment of any of the foregoing embodiments, the predefined quantity is one.

In a further embodiment of any of the foregoing embodiments, each of the additional surfaces are parallel to the meshed surface and are translations of the meshed surface along vectors that are normal to the meshed surface, and for each of the points of the meshed surface, the point and the corresponding points in the additional surfaces are provided on one of the vectors.

In a further embodiment of any of the foregoing embodiments, for each of the points of the meshed surface, the corresponding points are provided on opposing sides of the meshed surface.

In a further embodiment of any of the foregoing embodiments, the processing circuitry is configured to align a computer model of the sampling surface with the CT data prior to the querying of the interpolant function for the meshed surface and additional surfaces, such that the computer model of the surface and the CT data are aligned for the projection of the CT data onto the meshed surface.

In a further embodiment of any of the foregoing embodiments, to align the computer model of the sampling surface with the CT data, the processing circuitry is configured to perform a translation, a rotation, or both, of one or both of the computer model and the CT data.

In a further embodiment of any of the foregoing embodiments, the CT data of the component is segmented CT data, the component is a ceramic matric composite (CMC) component, and the processing circuitry is configured to obtain initial CT data for the CMC component and segment the initial CT data between CMC and voids to obtain the segmented CT data.

In a further embodiment of any of the foregoing embodiments, the metric is a void area fraction of the surface that extends through the CMC component.

In a further embodiment of any of the foregoing embodiments, at least a portion of the sampling surface includes an interfacial area where layers of the CMC component abut each other.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
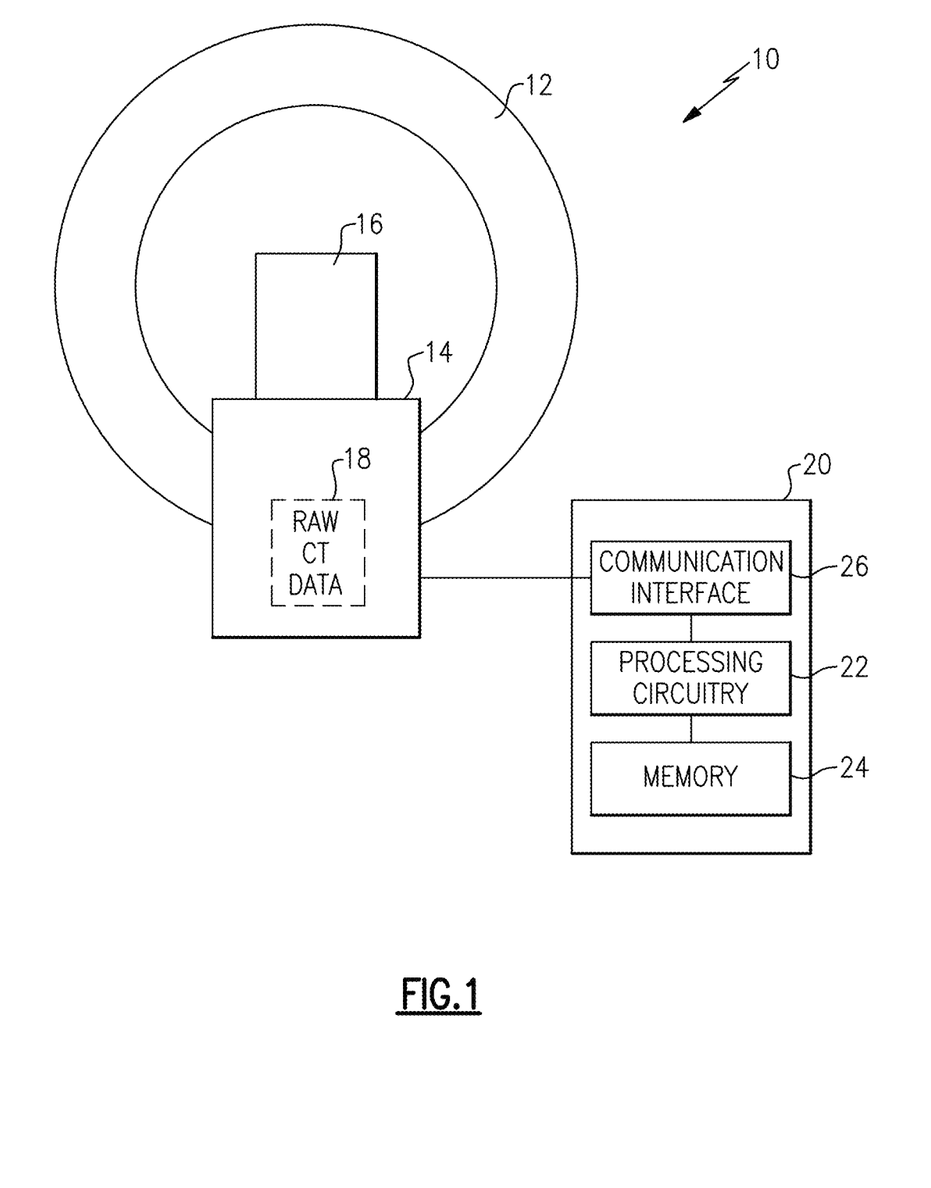
FIG. 1 is a schematic view of an example system for analyzing CT data.

FIG. 1 is a schematic view of an example system 10 for analyzing computed tomography (CT) data. The system 10 includes a CT scanner 12 having a bed 14 onto which a component 16 can be placed for CT scanning. The CT scanner 12 scans the component 16 and determines raw CT data 18, which is then provided to a computing device 20 for processing. The component 16 may be a part of a vehicle, such as a CMC component, for example, that has multiple phases (e.g., CMC areas and voids). In one particular example, the component is a turbine blade for a gas turbine engine. Of course, it is understood that CMC components are only a non-limiting example, and that other types of components 16 could be used (e.g., non-CMC components, components that are not utilized in gas turbine engines, human tissue, etc.).

The computing device 20 includes processing circuitry 22 operatively connected to memory 24 and a communication interface 26. The processing circuitry 22 may include one or more microprocessors, microcontrollers, application specific integrated circuits (ASICs), or the like, for example.

The memory 24 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 24 may incorporate electronic, magnetic, optical, and/or other types of storage media. The memory 24 can also have a distributed architecture, where various components are situated remotely from one another, but can be accessed by the processing circuitry 22.

The communication interface 26 is configured to facilitate communication between the computing device 20 and the CT scanner 12 through wired and/or wireless communication.

Although only a single computing device 20 is shown, it is understood that the processing circuitry may 22 be provided in multiple computing devices, each of which perform one or more of the features discussed herein.

Figure 2:
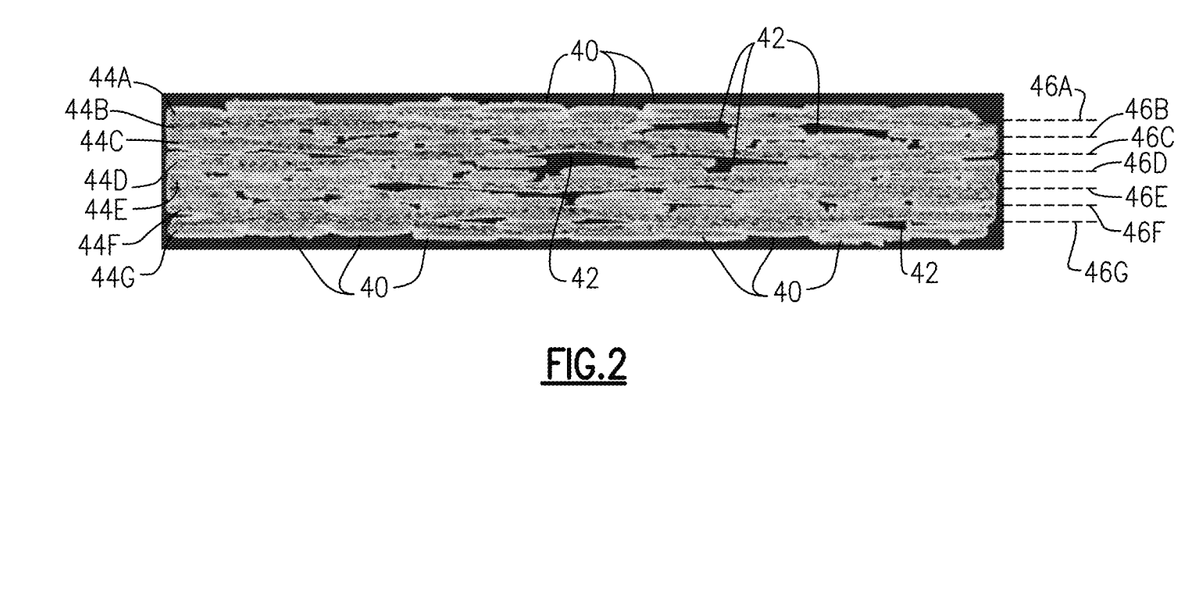
FIG. 2 schematically illustrates an example CT scan for a ceramic matrix composite (CMC) component.

FIG. 2 schematically illustrates an example CT scan for a ceramic matrix composite (CMC) component. In particular, FIG. 2 depicts a CT scan of a cross section of an example CMC component. The various oval shaped regions represent tows 40, which are groups of fibers. The tows 40 are woven into layers known as plies 44A-G. The black areas between the tows 40 represent voids 42. A plurality of idealized interfacial surfaces 46A-G are shown that extend through the component.

As shown in FIG. 2, the interfaces between plies 44 are non-planar and non-uniform due to nesting, variability in tow spacing, and ply misalignment. This presents challenges for analyzing the void area fraction of surfaces of the component, because the surface being analyzed may stray from the actual interface between plies 44.

Figure 3:
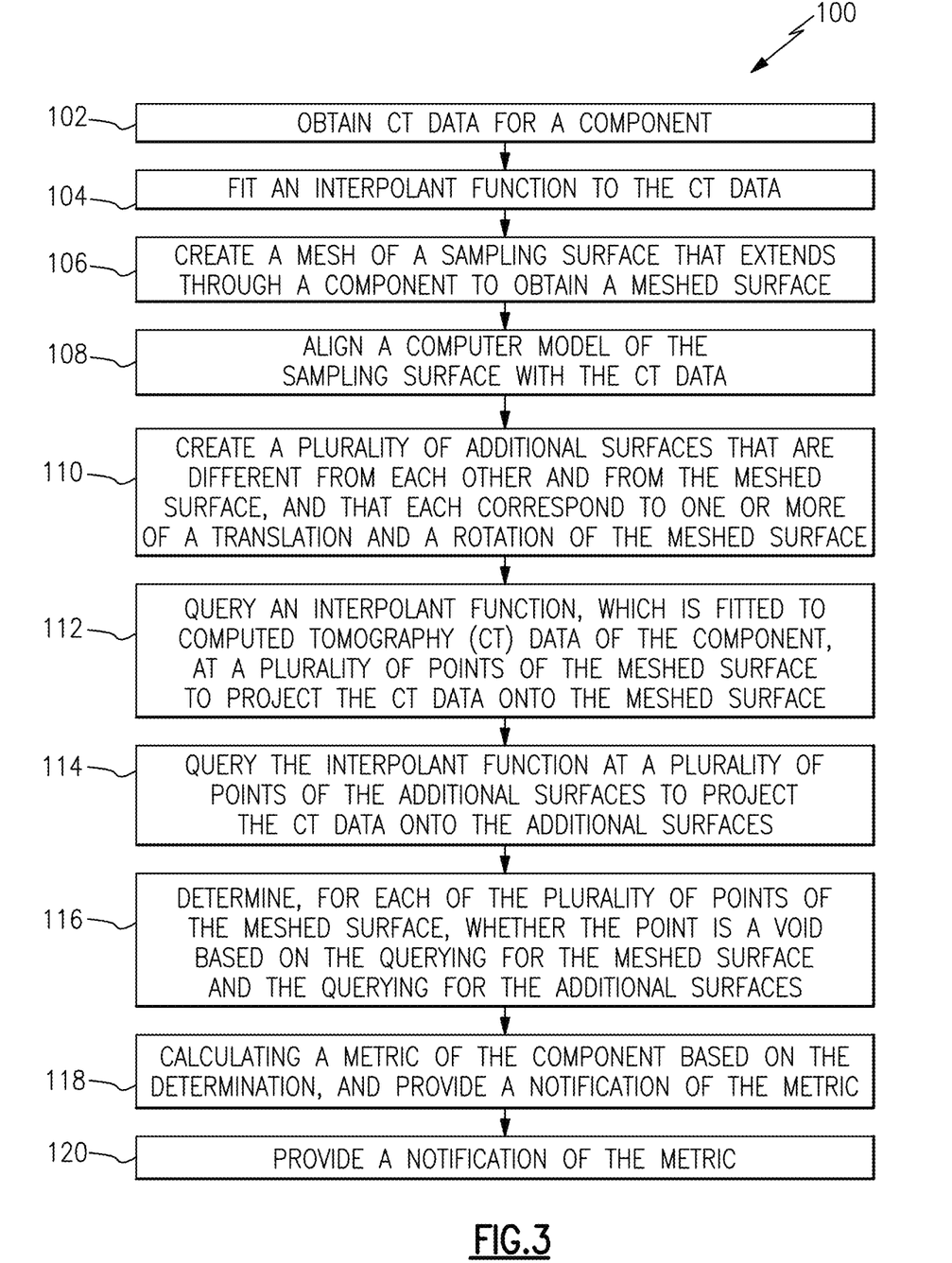
FIG. 3 is a flowchart of an example method of analyzing CT data.

FIG. 3 is a flowchart of an example method 100 of analyzing CT data of the component 16. The method 100 may be performed by the computing device 20, for example. The method 100 is not limited to analyzing a single surface at a time. In one example, multiple surfaces that extend through the component CT data can be queried in parallel or individually.

The surfaces to be analyzed using the method 100 may be curved in all three directions, for example, and therefore be non-planar. As used herein, a "surface" does not need to be an exterior surface, and may include a slice that extends through the component 16. In one example, the surface corresponds to an interfacial area where layers of the component 16 (e.g., CMC plies) come together and abut each other.

Segmented CT data for the component 16 is obtained (step 102). In one example, step 102 includes obtaining initial CT data for the component 16 (e.g., the raw CT data 18), and segmenting the initial CT data based on a specific segmentation resolution and selection of phases. The resolution and phases may be user-selected, for example. Some example phases could include alpha and beta phases of a titanium structure for example, or CMC areas and voids in a CMC component, or heart tissue and non-tissue areas in a human heart, for example. The segmented CT data may then be used for steps 104, 108, etc.

Commercially available software for 3D image processing/model generation/materials characterization that can perform CT data segmentation are known to those of ordinary skill in the art. Segmented CT data is typically stored in Digital Imaging and Communications in Medicine (DICOM) files.

If determination of a void area fraction of the component 16 is desired, a user may choose to segment the CT data between CMC and voids, with each being assigned a different pixel value. Once the images are segmented and exported (e.g., to the DICOM format), the segmented CT data can then be imported for processing (e.g., using models built with Matlab or Python). Importing the sequence of DICOM image files results in a 3D array of values representing voxel values in a regular grid covering the scanned domain (i.e., uniform point cloud). Along with the pixel values, DICOM files contain metadata such as pixel spacing along the rows and columns and sequential image spacing.

An interpolant function is fitted to the CT data based on the 3D array of pixel values and the associated metadata (e.g., pixel spacing) (step 104). Triangulation or tetrahedrization based methods, such as Delaunay triangulation, may be used to perform step 104. Some other methods that may be used in some examples are inverse distance weighted methods, radial basis function methods, and natural neighbor methods.

A mesh of a sampling surface (e.g., a non-planar surface) that extends through the component 16 is created to obtain a meshed surface (step 106). As discussed above, the surface does not need to be an exterior surface, and may include a slice through the component 16 (e.g., a virtual surface). In one example, the surface includes an interfacial area where layers of a CMC component abut each other (e.g., the interfaces between plies 44 in FIG. 2).

The "meshing" of step 106 may include utilizing commercially available finite element mesh analysis computer software to generate polygons and/or polyhedrals that connect in a series of lines and points to approximate a geometry of the sampling surface.

A computer model (e.g., a CAD model) of the sampling surface that extends through the component 16 is aligned or "registered" with the CT data (step 108), such that the computer model and the CT data are aligned for subsequent steps. This includes performing a translation, a rotation, or both, of one or both of the computer model and the CT data. A location and orientation of the component 16 in the segmented CT data and a mathematical representation of a geometry of the surface that extends through the component 16 in the computer model, with respect to a global coordinate system, are likely different prior to alignment, so the alignment/registration step may be used to address that discrepancy. The alignment step 108 may include a translation T and/or rotation M on the computer model of the sampling surface that extends through the component 16 to align with the segmented CT data (or vice versa) so that the two are geometrically aligned.

In one example, the alignment of step 108 is performed using commercially available software 3D image processing/model generation software, where once aligned, the resulting rotation matrix and translation vector can be output and used to transform any arbitrary surface that extends through the component 16.

Figure 4:
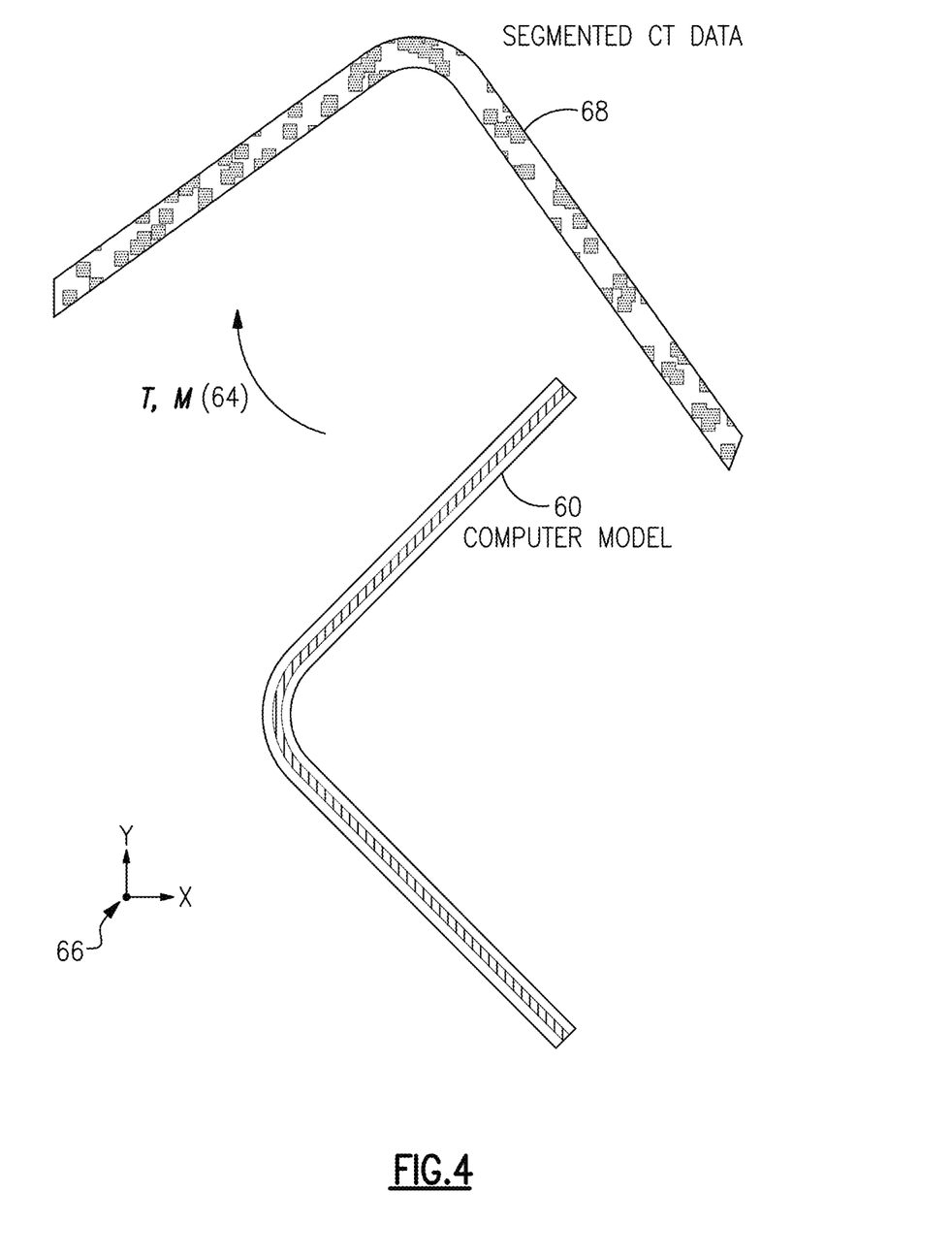
FIG. 4 schematically illustrates an example rotation and translation of a computer model of a surface that extends through a component with respect to a coordinate system to be aligned with segmented CT data.

FIG. 4 schematically illustrates an example rotation and translation of a computer model 60 of a surface that extends through a component with respect to a coordinate system to be aligned with segmented CT data 68. The translation and rotation is schematically shown as 64 in FIG. 4.

In one example, instead of using an alignment feature in software, the alignment process is performed manually. For example, a translation vector can be obtained by determining points that should be coincident on the model geometry and in the segmented CT data, represented in the same global coordinate system. The difference in these points along the three Cartesian axes may provide the necessary translation (e.g., [dx, dy, dz]) of the model geometry. To determine the appropriate rotation of the body in 3D space, representations of rotations such as axis-angle pair, rotation matrix, Euler angles, and quaternions may be employed to fully align or "register" the surface intersecting the component 16 with the CT data. These methods are known to those of ordinary skill in the art, and therefore are not discussed in detail herein.

A plurality of additional surfaces, which may be virtual surfaces, are created that are different from each other and from the meshed surface, and which each correspond to one or more of a translation and a rotation of the meshed surface (step 110). As used herein, "creating" a virtual surface does not require construction of an actual physical surface, but rather refers to calculating surfaces in software that differ from the meshed surface.

In one example, each of the additional surfaces are parallel to the meshed surface and are translations of the meshed surface along vectors that are normal to the meshed surface, and for each of the points of the meshed surface, the point and the corresponding points in the additional surfaces are provided on one of the vectors. The translations may be provided in the positive and negative normal directions, for example.

Figure 5:
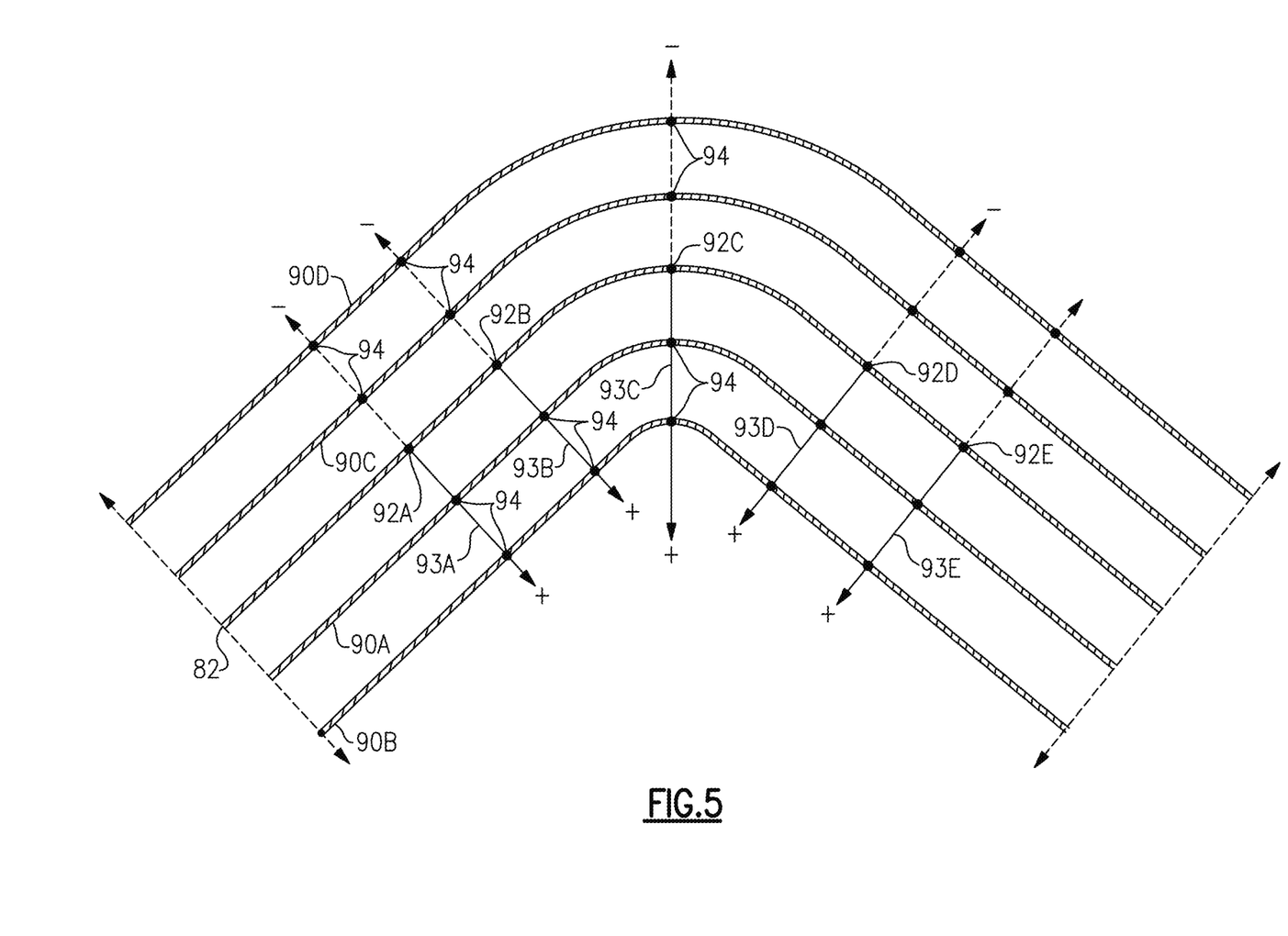
FIG. 5 schematically illustrates an example idealized meshed surface and its corresponding additional surfaces.

FIG. 5 schematically illustrates an example idealized meshed surface 82 and its corresponding additional surfaces 90A-D. For each of a plurality of points 92A-E of the meshed surface 82, a plurality of vectors 93A-E are computed that are normal to the surface 82. Using these vectors 93, a plurality of additional surfaces 90A-D are created that are different from each other and are different from the meshed surface 82. The additional surfaces 90A-B are provided on a first side of the meshed surface 82, and the additional surfaces 90C-D are provided on a second side of the meshed surface 82 that is opposite to the first side. Thus, as shown in the Example of FIG. 5, the additional points 94 are provided on opposing sides of the meshed surface 82.

In the example of FIG. 5, the additional surfaces 90A-D are parallel to the meshed surface 82. As used herein, the additional surfaces 90 being "parallel" to the meshed surface 82 does not require the surfaces 82, 90 to be planar, but rather refers to a translation of the meshed surface 82 (e.g., in the positive and negative directions with respect to the vectors 93).

Each vector 93 extends from the meshed surface 82 in a positive direction (see positive "+" signs in FIG. 5), and can also be extended in a negative direction (see negative "−" signs in FIG. 5). In the example of FIG. 5, surfaces 90A-B correspond to points 94 translated in the positive direction of the vectors 93, and surfaces 90C-D correspond to points 94 translated in the negative direction of the vectors 93.

Although only five vectors 93 are shown in FIG. 5, this is only a simplified example for illustrative purposes, and it is understood that any quantity of vectors could be used, such as a vector for each point of the meshed surface 82 (e.g., hundreds or thousands of vectors).

The normal vectors may be determined by fitting a plane using a least squares fit, singular value decomposition, or more complex methods such as M-estimator SAmple Consensus (MSAC) algorithm to each point of the surface and its nearest neighbors. The number of neighbors to consider may be determined based on the density of the surface mesh. The MSAC algorithm is discussed in the academic paper entitled "MLESAC: A New Robust Estimator with Application to Estimating Image Geometry" by Torr et al. from 2000.

The number of additional surfaces may be a function of the CT data resolution, while the maximum additional surface distance from the original meshed surface 82 may be informed by the material architecture and microstructures. This distance could be equal to the average tow height or half a ply thickness, for example. In one example, the goal is to create additional surfaces (e.g., parallel surfaces) that will enclose, in a volumetric sense, all the voids which "belong" to a particular interface and not those of neighboring interfaces.

Once the interpolant has been fit and the computer model and CT data aligned and registered, the interpolant function is queried at points of the meshed surface to project the CT data onto the surface (step 112). This involves projecting the phase (e.g., CMC or void) at the points. Possible interpolation techniques include linear, nearest neighbor, natural neighbor, cubic, or other higher order polynomials functions, for example.

The interpolant function is also queried at a plurality of points of the additional surfaces to project the CT data onto the additional surfaces (step 114). Referring again to FIG. 5, the points 94 in the additional surfaces 90 may be used for step 114, where the interpolant function is queried at a plurality of additional points (e.g., the points 94) of the additional surfaces (e.g., the additional surfaces 90A-D) to project the CT data onto the additional surfaces. In one example step 114 involves querying pixels (e.g., μCT pixels) of the CT data a prescribed distance along the vectors 93 (which may be normal vectors) in both positive and negative directions, for at each point 92 of the meshed surface 82.

A determination is made in step 116 for each of the plurality of points 92 of the meshed surface 82 of whether the point 92 is a void based on the querying for the meshed surface 82 in step 112 and the querying for the additional surfaces 90 in step 114.

A metric of the component 16 is calculated (step 118) based on the determination of step 116, and a notification of the metric is provided (step 120).

When step 116 is performed, the determination of whether a point 92 on the meshed surface 82 is a void is performed based on whether the point 92 or the corresponding points on its vector 93 are voids. Thus, for each of the additional surfaces 90A-D, each of the plurality of points 94 of the additional surfaces 90 corresponds to a respective one of the points 92 of the meshed surface 82. As an example, consider point 92A. The points in the positive and negative direction of vector 93A correspond to the point 92A. Similarly, the points in the positive and negative direction of vector 93B correspond to point 92B of the meshed surface 82.

In one example, the determining step of 116 includes determining that a particular point 92 on the meshed surface 82 is a void based on a predefined quantity of its corresponding points in the additional surfaces 90 being a void. In one example, the predefined quantity is one. Thus, referring again to vector 93A, in one example if any of the points 94 in the positive or negative direction of vector 93A is a void, then step 116 may include determining that the point 92A even is a void based on its corresponding points 94, even if the CT data for point 92A alone does not indicate that the point 92A is a void. If not a void, a point 92 may be determined to be a CMC phase of a CMC component, for example. This procedure may be performed for every point 92 on the idealized meshed surface 82 until all of the points 92 have been classified (e.g., as CMC or void). With this information, the metric of step 118 (e.g., a void area fraction) can more accurately be computed and used for determining effective CMC properties.

The metric determined in step 118 may include a phase area fraction, such as a void area fraction, for example (e.g., of a surface that extends through a CMC component). However, void area fraction is a non-limiting example. Other examples of metrics that may be determined in step 118 include coefficient of thermal expansion, thermal conductivity, strength of an interface, fracture toughness, interfacial stiffness, interfacial strength, etc. If one has the phase area fraction of the component 16 and knows the physical properties of each phase (e.g., coefficient of thermal expansion, conductivity, stiffness), one can calculate these physical properties of the component 16 as a whole. Thus, in one example, for computing one or more of these other example metrics, the method 100 includes an additional step to map the phase area fraction to some physical metric such as interfacial strength.

The notification of step 120 could include providing a visual indication on an electronic display (e.g., on a graphical user interface), providing an auditory notification, and/or could include saving the metric of step 118 in the memory 24, for example.

Figure 6:
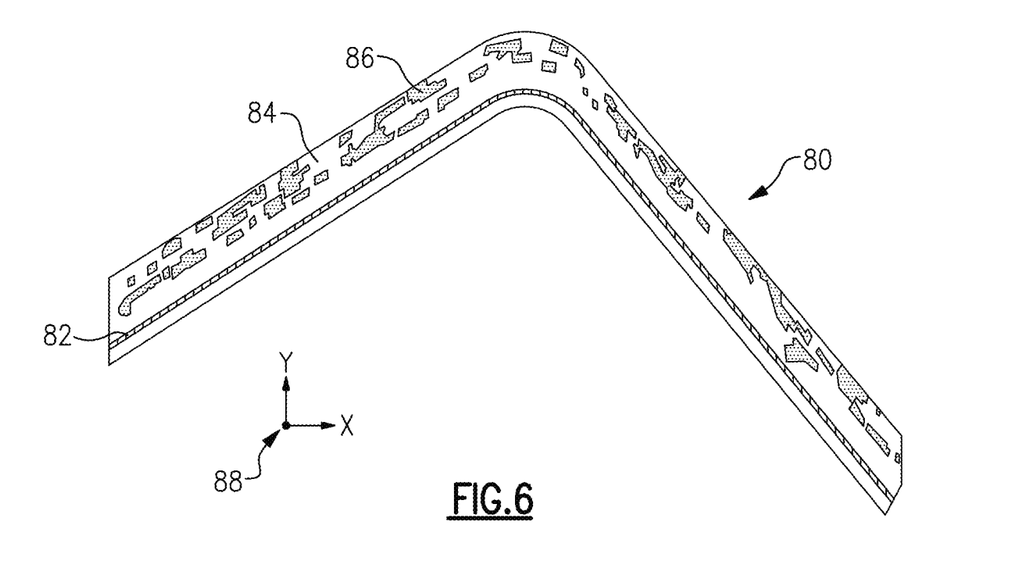
FIG. 6 schematically illustrates an example component and a surface that extends through the component.
Figure 7:
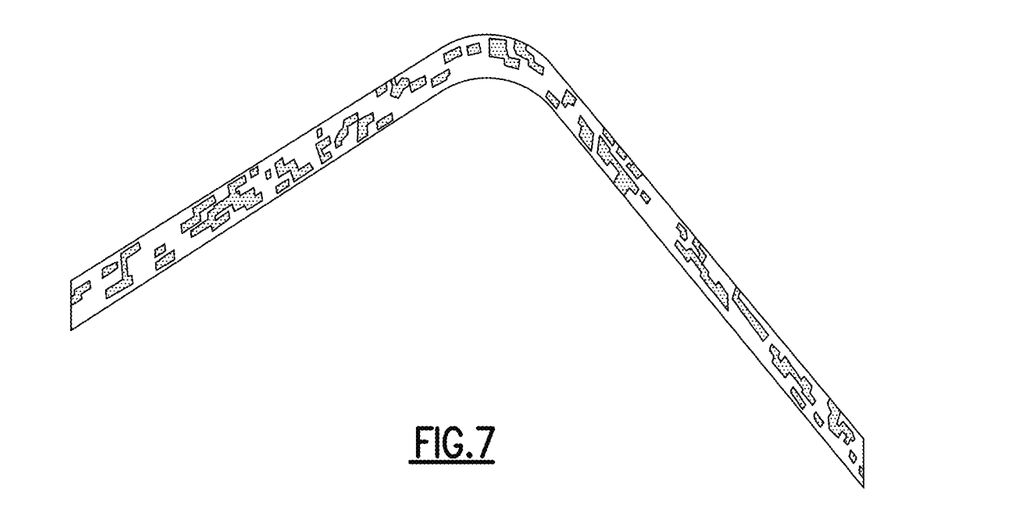
FIG. 7 schematically illustrates an example projection of computed tomography data onto the idealized surface of FIG. 5.

FIGS. 6-7 provide an example of step 112 of FIG. 3.

FIG. 6 schematically illustrates an example component 80, which includes a surface 82, CMC areas 84, and cuboid void areas 86 dispersed throughout the component 80. The surface 82 is non-planar, is not aligned with the Cartesian axes (shown at 88), and is a slice of the component 80.

FIG. 7 schematically illustrates an example projection of CT data onto the surface 82 of FIG. 6, which enables a void area fraction to be determined (e.g., $v_v^{surface}=31.2\%$) and/or other metrics of interest, such as thermal or mechanical properties. In a similar manner to how CT data is projected onto the surface 82, CT data is also projected onto the additional surfaces 90 in step 114.

Therefore, a method is devised to improve void area fraction quantification by considering the unknown variation in interface location. This is achieved by computing the normal vector of the idealized interface and querying the μCT pixels a prescribed distance along those vectors, in both directions, at each point of the idealized interface. If a void is encountered along the normal vector, the point of the interface corresponding to that normal vector is classified as a void. If no void is encountered, the point of the interface may be classified as CMC. This procedure may be performed for every point of the idealized ply interface until all the points have been classified as either CMC or void. With this information, the void area fraction can more accurately be computed and used for determining effective CMC properties.

The method 100 discussed above provides an improved method of analyzing CT data (e.g., void area fraction quantification) by considering unknown variations in interface location. Because of variability in interlaminar void distribution, it is unlikely that a single idealized interface surface 82, regardless of alignment, can achieve an accurate assessment of interfacial void fraction. Referring back to FIG. 2, as an example, if one were to assume the interfaces of the flat panel were idealized planes, the area fraction would likely be severely underestimated because manufacturing-related non-uniformities would likely be ignored. The method 100 takes this into account by adaptively sampling CT data in the neighborhood of the interface so that void determination for a particular point of an idealized layer (surface 82) is based on corresponding points from adjacent layers. This may be used to provide an improved estimate of interfacial void fraction, for example.

The availability of a process to quantify the void area fraction on an arbitrary surface passing through CT data with microstructural variability provides a general approach to accurately characterize the location-specific microstructure of specimens and parts. Current methods lack consideration of non-ideal microstructural interfaces and therefore are likely to underpredict void content.

The challenges associated with quantifying the spatially-varying void fraction in CMC components exist in all industries where CMCs and structural ceramics are utilized. Therefore, the method 100 may be useful for the aerospace, defense, and power generation (e.g., fossil fuel and nuclear) industries.

Although the steps of the method 100 have been depicted in a particular order, it is understood that certain ones of the steps could be reordered.

Although CMC components are discussed in detail above, it is understood that the present disclosure is not limited to CMC components, and that other non-CMC components could be analyzed using the techniques discussed herein.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of analyzing computed tomography data, comprising:
   creating a mesh of a sampling surface that extends through a component to obtain a meshed surface;
   creating a plurality of additional surfaces that are different from each other and from the meshed surface, wherein each of the additional surfaces are translations of the meshed surface along vectors that are normal to the meshed surface;
   querying an interpolant function, which is fitted to computed tomography (CT) data of the component, at a plurality of points of the meshed surface to project the CT data onto the meshed surface;
   for each of the points of the meshed surface, querying the interpolant function at a plurality of corresponding points of the additional surfaces to project the CT data onto the additional surfaces, wherein for each of the points of the meshed surface, the point and its corresponding points in the additional surfaces are provided on a respective one of the vectors that are normal to the meshed surface;
   determining, for each of the plurality of points of the meshed surface, that the point is a void based on either of the following occurring:
      the querying of the point in the meshed surface indicating that the point is a void;
      the querying of the corresponding points in the additional surfaces indicating that a predefined quantity of the corresponding points are voids; and
   calculating a metric of the component based on the determining, and providing a notification of the metric.

2. The method of claim 1, wherein the predefined quantity is one.

3. The method of claim 1, wherein the translations are provided in a positive direction and a negative direction, such that for each of the points of the meshed surface, the corresponding points are provided on opposing sides of the meshed surface.

4. The method of claim 1, comprising:
   aligning a computer model of the sampling surface with the CT data prior to the querying steps, such that the computer model of the surface and the CT data are aligned for the projection of the CT data onto the meshed surface.

5. The method of claim 4, wherein said aligning the computer model of the sampling surface with the CT data comprises performing a translation, a rotation, or both, of one or both of the computer model and the CT data.

6. The method of claim 1, wherein the CT data of the component is segmented CT data, the component is a ceramic matric composite (CMC) component, and the method comprises:
   obtaining initial CT data for the CMC component; and
   segmenting the initial CT data between CMC and voids to obtain the segmented CT data.

7. The method of claim 6, wherein the metric is a void area fraction of the sampling surface that extends through the CMC component.

8. The method of claim 6, wherein at least a portion of the sampling surface includes an interfacial area where layers of the CMC component abut each other.

9. A system for analysis of computed tomography data, comprising:
   processing circuitry operatively connected to memory, the processing circuitry configured to:
   create a mesh of a sampling surface that extends through a component to obtain a meshed surface;
   create a plurality of additional surfaces that are different from each other and from the meshed surface, and that each correspond to one or more of a translation and a rotation of the meshed surface, wherein each of the additional surfaces are translations of the meshed surface along vectors that are normal to the meshed surface;
   query an interpolant function, which is fitted to computed tomography (CT) data of the component, at a plurality of points of the meshed surface to project the CT data onto the meshed surface;
   for each of the points of the meshed surface, query the interpolant function at a plurality of corresponding points of the additional surfaces to project the CT data onto the additional surfaces, wherein for each of the points of the meshed surface, the point and its corresponding points in the additional surfaces are provided on a respective one of the vectors that are normal to the meshed surface;
   determine, for each of the plurality of points of the meshed surface, that the point is a void based on either of the following occurring:
      the query of the point in the meshed surface indicating that the point is a void;
      the query of the corresponding points in the additional surfaces indicating that a predefined quantity of the corresponding points are voids; and
   calculate a metric of the component based on the determining, and provide a notification of the metric.

10. The system of claim 9, wherein the predefined quantity is one.

11. The system of claim 9, wherein the translations are provided in a positive direction and a negative direction, such that for each of the points of the meshed surface, the corresponding points are provided on opposing sides of the meshed surface.

12. The system of claim 9, wherein the processing circuitry is configured to:
align a computer model of the sampling surface with the CT data prior to the querying of the interpolant function for the meshed surface and additional surfaces, such that the computer model of the surface and the CT data are aligned for the projection of the CT data onto the meshed surface.

13. The system of claim 12, wherein to align the computer model of the sampling surface with the CT data, the processing circuitry is configured to perform a translation, a rotation, or both, of one or both of the computer model and the CT data.

14. The system of claim 9, wherein the CT data of the component is segmented CT data, the component is a ceramic matric composite (CMC) component, and the processing circuitry is configured to:
obtain initial CT data for the CMC component; and
segment the initial CT data between CMC and voids to obtain the segmented CT data.

15. The system of claim 14, wherein the metric is a void area fraction of the surface that extends through the CMC component.

16. The system of claim 14, wherein at least a portion of the sampling surface includes an interfacial area where layers of the CMC component abut each other.

* * * * *